(12) United States Patent
Höreth et al.

(10) Patent No.: US 10,602,750 B2
(45) Date of Patent: Mar. 31, 2020

(54) PICKLING MACHINE WITH DETECTION DEVICE

(71) Applicant: Günther Maschinenbau GmbH, Dieburg (DE)

(72) Inventors: Jens Höreth, Brensbach (DE); Jörg Schwebel, Fischbachtal (DE)

(73) Assignee: Gunther Machinenbau GmbH, Dieburg (DE)

( * ) Notice: Subject to any disclaimer, the term of this patent is extended or adjusted under 35 U.S.C. 154(b) by 175 days.

(21) Appl. No.: 15/535,432

(22) PCT Filed: Aug. 5, 2016

(86) PCT No.: PCT/EP2016/068728
§ 371 (c)(1),
(2) Date: Jun. 13, 2017

(87) PCT Pub. No.: WO2017/025453
PCT Pub. Date: Feb. 16, 2017

(65) Prior Publication Data
US 2017/0367356 A1    Dec. 28, 2017

(30) Foreign Application Priority Data

Aug. 13, 2015 (DE) .................. 10 2015 113 377

(51) Int. Cl.
| | | |
|---|---|---|
| A47J 43/16 | (2006.01) |
| A23B 4/26 | (2006.01) |
| A23B 4/28 | (2006.01) |
| A22C 17/00 | (2006.01) |
| A23L 13/70 | (2016.01) |
| A22C 9/00 | (2006.01) |

(52) U.S. Cl.
CPC ............... *A23B 4/28* (2013.01); *A22C 9/001* (2013.01); *A22C 17/0053* (2013.01); *A23L 13/72* (2016.08); *A23V 2002/00* (2013.01)

(58) Field of Classification Search
CPC ............... A47J 43/16; D04B 35/10–18; A22C 17/00–0053; A22C 9/00–001; A23B 4/26–28
See application file for complete search history.

(56) References Cited

U.S. PATENT DOCUMENTS

| | | | | |
|---|---|---|---|---|
| 3,965,809 A | * | 6/1976 | Kieldsen ................. | A23N 4/06 99/492 |
| 3,987,649 A | * | 10/1976 | Parker ..................... | D04B 35/18 66/157 |
| 4,690,046 A | * | 9/1987 | Corominas ............. | A23B 4/285 99/533 |
| 5,142,971 A | * | 9/1992 | Norrie ................... | A22C 17/0053 99/487 |
| 5,664,488 A | * | 9/1997 | Smith ..................... | A23B 4/28 99/487 |

(Continued)

FOREIGN PATENT DOCUMENTS

| | | |
|---|---|---|
| DE | 19719414 A1 | 11/1998 |
| DE | 10124292 A1 | 11/2002 |

(Continued)

*Primary Examiner* — Michael A Laflame, Jr.
(74) *Attorney, Agent, or Firm* — Rogowski Law LLC

(57) ABSTRACT

The invention relates to a pickling machine comprising a detection device for detecting if a needle is blocked, damaged and/or broken.

11 Claims, 2 Drawing Sheets

(56) References Cited

U.S. PATENT DOCUMENTS

| | | | |
|---|---|---|---|
| 6,318,132 B1 * | 11/2001 | Gutschmit | D04B 35/18 66/123 |
| 6,488,668 B1 | 12/2002 | Prindle | |
| 9,770,014 B2 * | 9/2017 | Hessler | A01K 45/007 |
| 2001/0052295 A1 * | 12/2001 | Thomas | A23B 4/28 99/532 |
| 2002/0152901 A1 | 10/2002 | Basile | |
| 2004/0109928 A1 | 6/2004 | Townsend | |
| 2005/0227602 A1 | 10/2005 | Hartwick | |
| 2010/0147162 A1 * | 6/2010 | Lagares Corominas | A22C 9/001 99/533 |

FOREIGN PATENT DOCUMENTS

| | | |
|---|---|---|
| DE | 202007012087 U1 | 11/2007 |
| DE | 102010019884 A1 | 11/2011 |
| EP | 0479447 A1 | 4/1992 |
| EP | 0561105 A1 | 9/1993 |
| EP | 0845215 A1 | 6/1998 |

* cited by examiner

PICKLING MACHINE WITH DETECTION DEVICE

CROSS-REFERENCE TO RELATED APPLICATIONS

This application is a national stage application (under 35 USC § 371) of PCT/EP2016/068728, filed Aug. 5, 2016, which claims benefit of German application No. 10 2015 113 377.6, filed Aug. 13, 2015, the contents of each of which are incorporated by reference herein.

BACKGROUND OF THE INVENTION

Technical Field and State of the Art

The present relates to a pickling machine with a detection device for detecting a blocked, damaged and/or broken needle.

German patent application DE 197 19 414 A1, European patent application EP 0 845 215 A1 or the translation of German patent document DE 603 08 216 T2 disclose largely standardized processes for injecting a liquid into an item of food. These devices are equipped with a group of hollow needles that are periodically inserted into the food item in repeated processing cycles in order to inject the liquid, especially brine. After the injection procedure, the hollow needles are pulled out again.

German patent application DE 101 24 292 A1 discloses a similarly structured pickling machine. The pickled product is conveyed on the bed of a conveyor belt. The needles are lowered together with a hold-down plate when the conveyor belt stops. The hold-down plate is laid onto the top of the pickled product while the needles penetrate more deeply into the pickled product. When the needles are pulled out, the hold-down plate applies counter-pressure to hold the pickled product down on the bed of the conveyor belt.

German patent application DE 10 2010 019 884 A1 discloses a pickling machine with a measuring device for detecting the volume and/or the height of the pickled product and/or the occupation density of the conveyor device. Measuring sensors determine the occupation density on the basis of changes in the electric and/or magnetic field of the sensors at various injection segments, for example, when the pickled product that is present on a conveyor device approaches the injection needles.

The needles are frequently damaged during the injection procedures, for example, due to wear and tear or because the needles have struck a bone. At times, a needle can break in that a piece of the needle, as a rule the tip of the needle, breaks off. It is particularly dangerous if the broken-off piece of the needle is left behind in the pickled product. This is why detection devices are used that examine the pickled product after the injection procedure. If a piece of a needle is detected, the machine stops so that the pickled product can be identified and removed.

In actual practice, it is not always ensured that parts of the damaged needle are detected when a needle has broken. Particularly if the broken-off needle pieces are small or if they are located, for instance, in the immediate vicinity of a piece of bone in the pickled product, these pieces are not detected by conventional detectors. Consequently, the machine is not stopped. The pickled product continues to be transported on the conveyor belt and might even be offered for sale. It is a huge risk for the health of consumers if such needle pieces are ingested together with the food.

It can also occur that needle defects are detected but that, due to the time interval that exists between the breaking of the needle and the detection, the critical pickled product might not be identified right away, so that a considerable number or even entire batches of the pickled products have to be removed. After all, as long as the machine does not stop, more and more pickled products continue to arrive on the conveyor belt in order to undergo the injection procedure, they are injected and then transported further. In the worst case scenario, the pickled product even has to be recalled from the shelves, which results in tremendous damage to the image of the company and is extremely detrimental to the producer.

Furthermore, when it comes to the prior-art pickling machines, impending needle damage, for example, cracks or deformations of the needles and/or blockage of the needles, cannot be automatically detected, so that the affected pickled product as well as the defective needle cannot be identified quickly enough and removed or replaced.

Before this backdrop, one objective of the present invention is to put forward a pickling machine that quickly identifies needles that have been damaged during an injection procedure.

SUMMARY OF THE INVENTION

The pickling machine for injecting liquid, especially brine, into a pickled product, has a needle bar and a plurality of injection needles arranged on it, which are normally configured as hollow needles and, as a rule, are made of stainless steel. According to one embodiment of the invention, a detection device is provided in order to detect a blocked, damaged and/or broken needle, said detection device having at least one sensor whose measured values are obtained from the movement of the needle relative to the sensor.

In this manner, if a needle breaks, a reliable detection can be ensured, even in the case of very small needle pieces, so that, if there is a needle break and a corresponding change in the length of the needle, the associated measured value provides precise information about the damage to the needle. The sensor also detects minute changes in the needle, so that very reliable results can be obtained.

During each procedure of injection of brine into the pickled product, the sensors measure values that supply information about the condition of the needles. Normally, the brine employed contains salt and is thus conductive. Owing to this conductivity, the flow conditions in the needle can be measured and detected by the sensors. If a needle becomes damaged or blocked, these measured values change and the detection device delivers an error signal to the control unit of the machine in order to trigger an automatic stop.

As an alternative or in addition, the error signal, for example, in the form of an acoustic signal or on a display, can be indicated to the operator of the pickling machine. Due to the immediate detection of a damaged or blocked needle, the pickling machine is stopped right away so that the affected pickled product is quickly identified and removed, thereby preventing a large number of rejects.

According to a first especially advantageous embodiment of the pickling machine according to the invention, it is provided for each needle to be associated with one sensor. In this manner, each of the needles arranged on the needle bar can be examined to check for possible blockage or damage, so that all in all, a quick identification of a damaged needle and of contaminated pickled product is made possible, and the damaged or blocked needle can be immediately replaced. This drastically reduces the downtime of the pickling machine and thus the financial losses.

According to a refinement of the invention, the at least one sensor is arranged in a hold-down plate of the pickling machine that serves to hold down the pickled product when the needles are being pulled out. An arrangement of the sensor directly on the needle would likewise be possible, but this is disadvantageous for certain types of sensors because of their structural size. The arrangement of the sensors in or on the hold-down plate is advantageous since then, the sensors are not inserted into the pickled product. Moreover, the sensors are held securely in the hold-down plate. The appropriate connection lines for electric and data signal transmission can likewise advantageously be arranged in or on the hold-down plate.

According to another advantageous embodiment of the invention, it is provided that the hold-down plate is divided into two parts and that the sensor is arranged between the parts of the hold-down plate. This makes it easy to install the sensors. Moreover, the lines needed to supply electricity to the sensors as well as the data lines can easily be laid and accommodated in a two-part hold-down plate, as a result of which the maintenance is also easier. It is also conceivable for the sensors to be cast together with the hold-down plate; in particular, epoxy resin can be used for fixation purposes. This also ensures that the sensors and the lines are protected against dirt and salt-induced corrosion due to the aggressive brine.

In a special embodiment of the pickling machine according to the invention, the sensor is configured as a contactless sensor, especially as an optical or capacitive sensor. A capacitive sensor can be fitted with one or more electrodes for monitoring the needles. These sensors are designed for contactless measurements, which is especially advantageous in clean rooms of the type used for processing pickled products. An optical sensor with a relatively large range is likewise provided for contactless distance measurements. Moreover, optical sensors such as, for instance, laser distance sensors, CMOS or CCD cameras, stand out for their high measuring precision.

Preferably, the sensor is configured as an inductive sensor, whereby the change in the induction field of the inductive sensor is correlated with a blocked, damaged and/or broken needle. Inductive sensors are wear and maintenance-free and they stand out for their particularly compact structure. Moreover, these sensors are suitable for use in serial production, as a result of which the manufacturing costs of the machine can be reduced. Furthermore, the accuracy of the measurement is very high and can be within approximately one micron. Therefore, inductive sensors are particularly suitable for the rough conditions encountered in pickling machines.

The inductive sensors can be based on a method for inductive distance measurement, also called linear variable differential transformer (LVDT). Here, two secondary coils are symmetrically installed at both sides of a primary coil or excitation coil. An inductive alternating field is generated by applying an alternating current at a constant amplitude and constant frequency to the primary coil of the sensor. The mechanically movable needle changes the coefficients of inductive coupling between the coils. A signal whose strength depends on the position of the needle is induced in the secondary coils of the sensor. Such inductive sensors are familiar, for example, from Wikipedia, and are sold, among others, by Micro-Epsilon Messtechnik GmbH, in Ortenburg, Germany.

The sensor can be arranged circumferentially on each associated needle. As a result, the needle moves inside the sensor during a measuring procedure and, in case of an LVDT, the arrangement can be symmetrical in the axial direction. When the needle is in the middle position, the voltages of the secondary coils offset each other and no output signal is generated. When the needle is shifted along the rotational axis of symmetry, unequal magnetic coupling is present and an initial signal is generated on the secondary coils. A directional signal of the needle can be generated by a correlation with the excitation voltage.

According to an especially advantageous refinement of the invention, it is provided that the sensors are divided into groups, thus forming a test matrix, whereby the series-connected sensors of adjacent groups are at a prescribed distance from each other. As a result, particularly in the case of inductive sensors and in the case of a very great density of the sensors because of the large number of needles on the needle bar, reciprocal interferences are avoided when adjacent sensors are active at the same time. If the series-connected sensors are too close together, a strong induction field is created, so that an individual detection per needle is no longer possible. For this reason, the activation and control of the needles by means of a test matrix is advantageous. After all, the needles can be tested in groups without the inductive fields influencing each other and falsifying the measurements. Consequently, a high accuracy in the detection of blocked and/or damaged needles is ensured.

According to an especially advantageous refinement of the invention, it is provided that the distance between the series-connected sensors of adjacent groups corresponds to at least twice the distance between adjacent needles. Especially if the distance between adjacent sensors is very small because of the high density of the sensors, the advantageous control of the sensors can avoid negative influences of the induction fields during the simultaneous actuation of the needles in the measuring mode.

In an especially advantageous embodiment of the invention, a control unit is provided that, during each detection procedure, activates only one sensor per group. This further increases the measuring accuracy. After all, as mentioned above, the pickled product is transported through the injection device on a conveyor belt. During the injection procedure, the conveyor belt stops and the needles pass through the hold-down plate and penetrate into the pickled product in order to inject it. Subsequently, the injected pickled product is transported further. When a defective needle is detected, the conveyor belt is stopped. As a result, the affected pickled product was only transported further on the conveyor belt for just a few injection cycles.

If a group comprises, for example, four needles, it can take four injection cycles at the maximum before a defective needle is detected and the machine is stopped. The pickled product would therefore only have been transported further during these four cycles at the most and it would have been easy to identify. It is particularly advantageous that, in this case, the pickled product that is to be inspected and that has already been injected with brine is still located in the conveyor device, that is to say, that it has not yet been placed into a collecting container or the like. As a result, the maximum number of rejects is reduced to just a few pieces of the pickled product and it is not the entire batch that is affected, which can be the case with the conventional detection methods for pickling machines.

According to an alternative or additional embodiment, the measured value of the sensor serves to determine the specific needle stroke. By continuously monitoring the needle, especially by means of a distance measurement, damage that is just beginning to occur can already be detected at an early point in time so that the needle in question can be replaced before it breaks. After all, if the needle stroke no longer corresponds to the original maximum stroke of the injection needle, this is an indication that this needle is already defective.

In an advantageous embodiment of the invention, an evaluation device for analyzing the measured values of the sensor is provided that indicates the quantity of liquid that is flowing through the needle. On the one hand, it is possible to determine the momentary quantity flowing through the needle, as a result of which a blocked needle can immediately be ascertained. On the other hand, the evaluation device can determine the total quantity that has flowed through within a specific period of time, for example, since the needle was placed into the needle bar. Furthermore, the quantity of liquid injected into the pickled product can be indicated so that this also constitutes an evaluation option.

Additional objectives, advantages, features and application possibilities of the present invention can be gleaned from the description below of an embodiment making reference to the drawings. In this context, all of the described and/or depicted features, either on their own or in any meaningful combination, constitute the subject matter of the present invention, also irrespective of their compilation in the claims or in the claims to which they refer back.

DETAILED DESCRIPTION OF EMBODIMENTS

Figure 1:
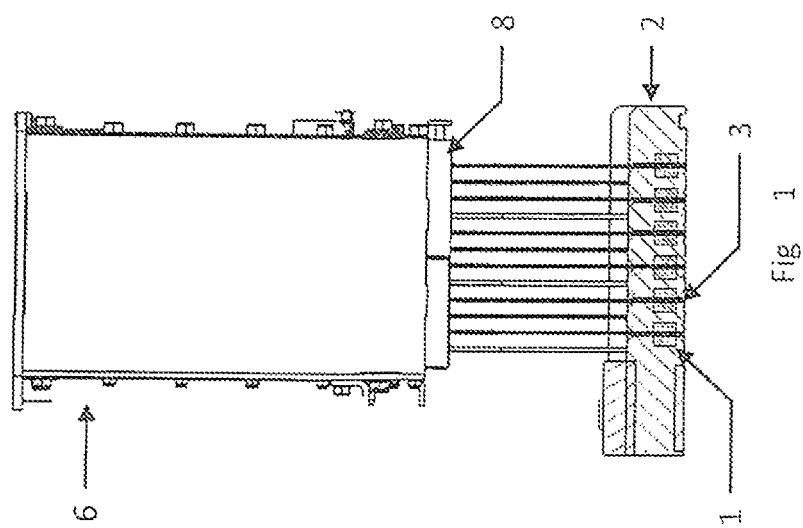
FIG. 1 a possible embodiment of a pickling machine according to the invention, with a detection device in a schematic depiction, and FIG. 2 an arrangement of needles in groups in a test matrix, likewise in a schematic depiction.

The pickling machine according to FIG. 1 serves to inject brine into a pickled product. It has a needle bar 6 and a plurality of hollow injection needles 3 arranged on it by means of a needle bridge 8. The needles 3 are preferably made of stainless steel. The needle bridge 8 is moved up and down together with the hollow needles 3 by means of a needle drive device. The pickled product is transported on a conveyor belt.

The needles 3 are passed through a hold-down plate 2 that holds the pickled product down on the bed of the conveyor belt while the needles 3 are being pulled out. The hold-down plate 2 can be moved up and down by means of a drive device, independently of the movement of the hollow needles 3 and of the needle bridge 8.

The pickled product is transported on a conveyor belt through the injection device. The hold-down plate 2 has holes through which the needles 3 pass. During the injection procedure, the conveyor belt stops and the needles 3 pass through the hold-down plate 2 and penetrate into the pickled product in order to inject it. Subsequently, the injected pickled product is transported further.

In the embodiment presented here, the hold-down plate 2 is divided into two parts. As set forth in the invention, a one-part or multi-part hold-down plate 2 is also possible.

Figure 2:
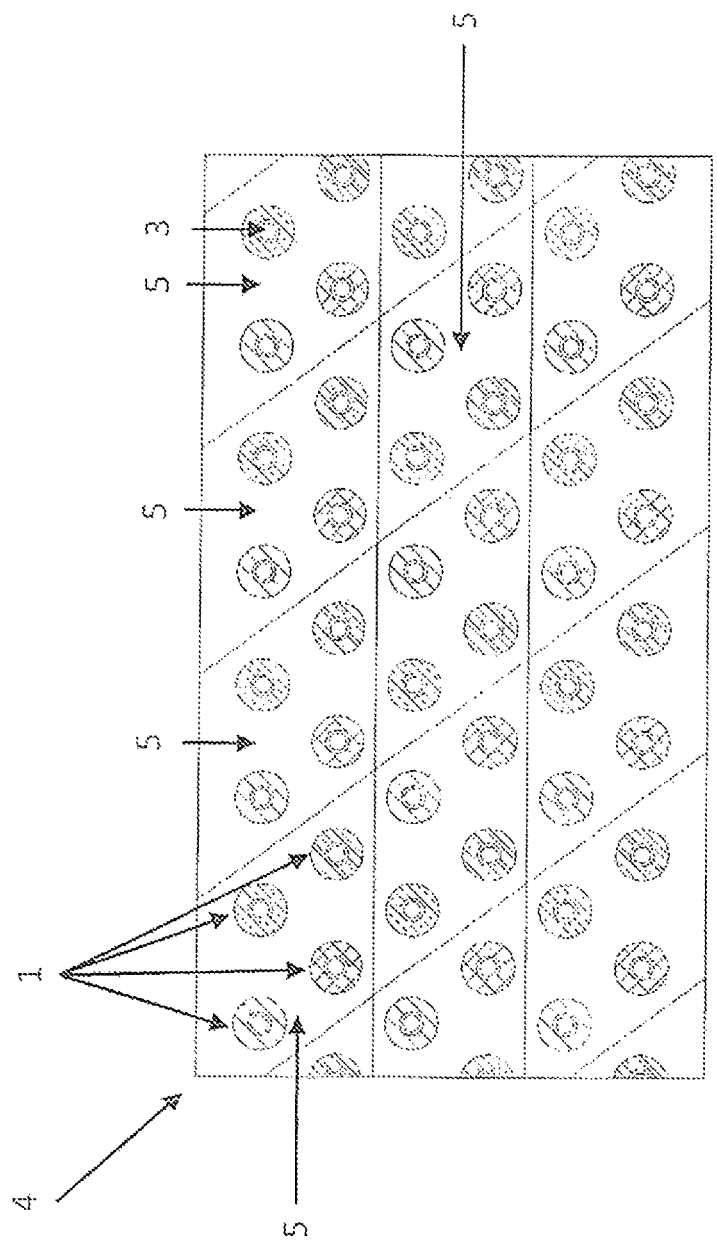

In the embodiment described here, a detection device 7 for detecting damage or blockage of the needles 3 has a sensor 1. Each needle 3 can be associated with a sensor 1 so that all of the needles 3 arranged on the needle bridge 8 are monitored by means of the detection device. The sensor 1 is located in the two-part hold-down plate and is arranged along the circumference on each associated needle 3, as can be seen in FIG. 1 and FIG. 2. It can also be provided that the sensors 1 are cast together with the hold-down plate 2; in particular, epoxy resin can be used for fixation purposes.

During each injection procedure, the needles 3 penetrate the pickled product (not shown here), so that the front part of the needles 3 pass through the hold-down plate 2 and can be detected by the sensor 1 arranged in the hold-down plate 2. A measured value registered by the sensor 1 is derived from the movement of the needle 3 relative to the sensor 1. In this manner, damage to the needle 3, especially a broken needle, can be immediately identified. When a defective needle 3 is detected, the machine and the conveyor belt are stopped. The affected pickled product is then transported further on the conveyor belt by only a few injection cycles. The needle 3 in question can then be replaced and the contaminated pickled product can be removed.

The above-mentioned embodiment makes use of an inductive sensor, but an optical or capacitive sensor or else a combination of various sensors can also be provided. A change in the induction field of the inductive sensor 1 is correlated with a blocked, damaged and/or broken needle 3, so that in this case, the sensor 1 issues an error signal and the machine is stopped.

Normally, the needles 3 are spaced very densely. As already mentioned, each needle 3 should be monitored by one sensor 1, as a result of which there is a large number of sensors 1, which are thus likewise arranged in very close proximity to each other. If all of the sensors 1 were to be activated in the measuring mode at the same time, the close proximity of the sensors 1 might cause the induction fields to interfere with each other, and this would result in erroneous measurements.

In order to prevent this, the sensors 1 are activated by a control unit, thus forming a test matrix. Such an arrangement can be seen in FIG. 2. For example, four adjacent needles 3 are each combined to form a group 5. Each sensor 1 of a group 5 is series-connected to one sensor 1 of the other groups 5.

If the distance between the sensors 1 that are in the measuring mode is not sufficient to avoid a reciprocal influence of the inductive fields because of the great density of the sensors 1, then the sensors are arranged in such a way that the distance between the series-connected sensors 1 of adjacent groups 5 is at least twice as much as the distance between adjacent needles 3. This ensures that there is enough distance between the active sensors 1 so that the induction fields do not interfere with each other.

As set forth in the invention, it is also possible to determine the stroke of the needle 3. If the measured stroke deviates from a value that, whenever possible, is prescribed in an evaluation device, then this could indicate damage to the needle 3.

Moreover, it is also conceivable to use the evaluation device to measure the quantity of brine flowing through the needle 3. The brine contains salt and is thus conductive. Owing to this conductivity, the flow situation in the needle 3 can be detected by the sensors 1. On the one hand, the momentary flow quantity through a needle 3 is determined and on this basis, a blockage or an impending blockage of the needle 3 can immediately be ascertained. Moreover, the evaluation device can determine the total quantity that has flowed through within a specific period of time, for example, since the needle 3 was placed into the needle bar 6 or else per batch of pickled product.

Moreover, it is also conceivable to determine the temperature of the needles 3 by means of the sensors 1. After all, the temperature is correlated with a change in the inductivity.

Additional objectives, advantages, features and application possibilities of the present invention can be gleaned from the description herein. In this context, all of the described and/or depicted features, either on their own or in any meaningful combination, constitute the subject matter of the present invention, also irrespective of their compilation in the claims or in the claims to which they refer back.

LIST OF REFERENCE NUMERALS

1 sensor
2 hold-down plate
3 needle
4 test matrix
5 group
6 needle bar
7 detection device
8 needle bridge

The invention claimed is:

1. A pickling machine for injecting liquid into a pickled product, comprising:
   a needle bar (6);
   a plurality of injection needles (3) arranged on the needle bar;
   a hold down plate (2) configured to hold the pickled product as the plurality of injection needles is pulled out of the pickled product and through which the injection needles (3) pass; and
   a detection device (7) for detecting a blocked, damaged and/or broken injection needle among the plurality of injection needles, said detection device having at least one sensor (1) whose measured values are obtained from movement of at least one of the plurality of injection needles relative to the sensor (1), wherein said at least one sensor (1) is on or in the hold down plate (2).

2. The pickling machine according to claim 1, wherein each needle of the plurality of injection needles (3) is associated with one sensor (1) per needle.

3. The pickling machine according to claim 1, wherein the hold-down plate (2) is divided into two parts, and the sensor (1) is arranged between the two parts of the hold-down plate (2).

4. The pickling machine according to claim 1, wherein the sensor (1) is an inductive sensor, wherein a change in induction field of the inductive sensor is correlated with a blocked, damaged and/or broken needle (3) in respect of the needle with which the sensor is associated among the plurality of injection needles (3).

5. The pickling machine according to claim 2, wherein the sensors (1) are divided into groups (5), thus forming a test matrix, and wherein sensors of each group are series-connected, and wherein the series-connected sensors (1) of adjacent groups (5) are positioned at a prescribed distance from each other.

6. The pickling machine according to claim 5, wherein adjacent needles (3) of the plurality of injection needles are spaced apart a first distance, and wherein the prescribed distance between the series-connected sensors (1) of adjacent groups (5) corresponds to at least twice the first distance between adjacent needles (3).

7. The pickling machine according to claim 5, further comprising a control unit that, during each detection procedure, activates only one sensor (1) per group (5).

8. The pickling machine according to claim 1, wherein in a distance measurement, the measured value of the sensor (1) serves to determine specific needle stroke movement.

9. The pickling machine according to claim 1, further comprising an evaluation device for analyzing measured values of the sensor (1) to correlate with a quantity of liquid that is flowing through the needle (3).

10. The pickling machine according to claim 1, wherein the sensor is a contactless sensor.

11. The pickling machine according to claim 10, wherein the contactless sensor is selected from the group consisting of: optical sensors, capacitive sensors and inductive sensors.

* * * * *

UNITED STATES PATENT AND TRADEMARK OFFICE
CERTIFICATE OF CORRECTION

PATENT NO. : 10,602,750 B2
APPLICATION NO. : 15/535432
DATED : March 31, 2020
INVENTOR(S) : Jens Horeth and Jorg Schwebel It is certified that error appears in the above-identified patent and that said Letters Patent is hereby corrected as shown below:

On the Title Page

Item (73): the Assignee name should be as follows:
Gunther Maschinenbau GmbH

Signed and Sealed this
Seventeenth Day of November, 2020

Andrei Iancu
*Director of the United States Patent and Trademark Office*